(12) United States Patent
Mizuno et al.

(10) Patent No.: US 6,701,262 B2
(45) Date of Patent: Mar. 2, 2004

(54) CURRENT DETECTING CIRCUIT

(75) Inventors: Fumiaki Mizuno, Nagoya (JP); Isao Isshiki, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 267 days.

(21) Appl. No.: 09/933,723

(22) Filed: Aug. 22, 2001

(65) Prior Publication Data

US 2002/0026287 A1 Feb. 28, 2002

(30) Foreign Application Priority Data

Aug. 23, 2000 (JP) .................................. 2000-252561

(51) Int. Cl.⁷ .............................................. G06F 19/00
(52) U.S. Cl. ...................................... 702/60; 307/10.1
(58) Field of Search ............................ 702/57, 58, 60, 702/64, 65, 117, 124, 126, 189, 198; 324/433, 537; 323/283; 307/10.1, 10.6

(56) References Cited

U.S. PATENT DOCUMENTS 5,337,013 A * 8/1994 Langer et al. .............. 324/537
5,451,881 A * 9/1995 Finger ........................ 324/433
5,610,503 A * 3/1997 Fogg et al. .................. 323/283
5,856,711 A * 1/1999 Kato et al. .................. 307/10.6
5,994,790 A * 11/1999 Nagashima et al. ........ 307/10.1

* cited by examiner

*Primary Examiner*—Marc S. Hoff
*Assistant Examiner*—Mohamed Charioui
(74) *Attorney, Agent, or Firm*—Oliff & Berridge, PLC

(57) ABSTRACT

In a current detecting circuit, a virtual earth generating circuit 7 generates a low voltage $V_{SS}$ lower by a predetermined potential difference than a battery voltage $V_{BT}$ outputted from anon-vehicle battery 1. A CPU 5 operates while the low voltage $V_{SS}$ is used as an earth potential and the voltage $V_{BT}$ higher by the predetermined voltage value than the low voltage $V_{SS}$ is used as a power-supply voltage. A/D conversion input terminals 53 and 54 of the CPU 5 are connected to the battery 1 side of a current detecting resistor 3 and the load 4 side of the resistor 3. The voltages on the battery 1 side and the load 4 side of the resistor 3 to be inputted to the terminals 53 and 54 are detected by an A/D converter 60. A load current $I_{LD}$ is calculated based on the detected results and the resistor 3 resistance.

5 Claims, 5 Drawing Sheets

CURRENT DETECTING CIRCUIT

BACKGROUND OF THE INVENTION

1. Field of the Invention

The present invention relates to a current detecting circuit for detecting a load current supplied from a power supply portion to a load.

2. Description of the Related Art

In a current supply circuit for supplying a load current from a power supply portion to a load when switching means is turned on, fuse has been heretofore widely used as protection means against an overcurrent. The fuse is inserted in series to the circuit so that, when an overcurrent flows, the fuse is blown to cut off the circuit. Hence, the fuse has an advantage of being capable of protecting the circuit surely. However, when an overcurrent flows to make the fuse blown out, the circuit cannot be restored unless the blown fuse is exchanged for a new one. There is therefore a problem that much labor is required for restoration of the circuit. Particularly in a vehicle, the modularization of the current supply circuit has been advanced in recent years and such fuse has been incorporated in a module. To exchange an old fuse for a new one, the old fuse had to be taken out first from the inside of the module and the new fuse was then incorporated in the module. Hence, the efficiency in the work of exchanging the fuse for a new one was very low.

Therefore, a configuration to dispense with the fuse has been discussed as follows. That is, in the configuration, the current flowing in the current supply circuit is monitored so that, when the level of the current deviates from a normal range, the switching means is turned off to cut off the circuit. A current detecting circuit for detecting a load current accurately is required for achieving the configuration.

A circuit as shown in FIG. 7 is known as the current detecting circuit of this type. In the circuit shown in FIG. 7, a high-precision low resistor 103 is series-connected between a battery 101 and a load 102 and the current flowing in the low resistor 103 is converted into a voltage by a conversion circuit 104. On the other hand, a reference voltage is generated from a reference voltage generating circuit 105. The converted voltage is compared with the reference voltage by a comparator circuit 106 so that a judgment is made as to whether the current flowing in the low resistor 103 is abnormal or not.

Incidentally, the reference voltage generating circuit 105 generated such a reference voltage with the earth as reference. Hence, it was necessary that a voltage drop over the low resistor 103 was converted into a value with reference to the earth by the conversion circuit 104. It was however difficult that the voltage drop over the low resistor 103 was converted accurately into a value with reference to the earth by the conversion circuit 104. Moreover, there was a problem that the configuration of the conversion circuit 104 became complex.

In addition, a battery voltage in a car varies relatively largely even in the case where the battery operates normally. To make it possible to generate a constant reference voltage regardless of the variation of the battery voltage, there was another problem that the circuit configuration of the reference voltage generating circuit 105 became complex.

SUMMARY OF THE INVENTION

The present invention is devised to solve the aforementioned problems and an object of the present invention is to provide a current detecting circuit in which a load current supplied from a power supply portion to a load can be detected by a simple circuit configuration.

According to the present invention, in a current supply circuit for supplying a load current from a power supply portion to a load when switching means interposed between the power supply portion and the load is turned on, there is provided a current detecting circuit constituted by: a voltage generating circuit for generating and outputting a second voltage which is lower by a predetermined voltage value than a first voltage outputted from the power supply portion; a current detecting resistor interposed between the power supply portion and the load and having a predetermined resistance value; an analog-digital conversion circuit which operates on the basis of a potential difference between the first voltage and the second voltage to thereby convert an analog value into a k-bit (k is an integer not smaller than 2) digital value; and an arithmetic circuit for calculating the load current or a value corresponding to the load current on the basis of digital values which are obtained by analog-digital conversion of voltages respectively on one and the other ends of the current detecting resistor by the analog-digital conversion circuit when the switching means is turned on.

According to this configuration, the second voltage lower by the predetermined voltage value than the first voltage outputted from the power supply portion is generated and outputted from the voltage generating circuit so that the analog-digital conversion circuit is operated by the potential difference between the first voltage and the second voltage.

When the switching means is turned on, the voltage on one end of the current detecting resistor and the voltage on the other end of the current detecting resistor are converted into k-bit digital values respectively by the analog-digital conversion circuit. The load current or a value corresponding to the load current, for example, the voltage drop over the current detecting resistor, is calculated on the basis of results of the conversion.

The analog-digital conversion circuit is operated by the potential difference between the first voltage and the second voltage lower by the predetermined voltage value than the first voltage as described above. By serving the second voltage as a virtual earth voltage for the analog-digital conversion circuit, it is unnecessary to convert the first and second voltages into values with reference to the actual earth. Hence, the load current or a value corresponding to the load current can be calculated by a simple configuration.

Further, in accordance with this configuration, detection of the load current can be made accurately. For example, the predetermined voltage is 5 V under the condition of k=8, the resolution of the digital value is 5 V/255 which is near to 20 mV (5 V/255≈20 mV). That is, when the numerical value k is changed, detection of the load current can be made with accuracy of a desired degree.

Further, the analog-digital conversion circuit may include: a divisional voltage output circuit for successively selectively outputting summation values which are obtained by adding the second voltage to various voltage values which are obtained by multiplying a divisional voltage by m (m is an integer of from 0 to (n-1)), the divisional voltage being obtained by dividing a potential difference between the first voltage and the second voltage into (n-1) parts (n is an integer satisfying n=$2^k$), and a comparator circuit for comparing the voltage on the one end of the current detecting resistor with each of the summation values which are successively selectively outputted from the divisional voltage output circuit and for comparing the voltage on the other end of the current detecting resistor with each of the summation values which are successively selectively outputted from the divisional voltage output circuit; and the arithmetic circuit may calculate the load current or a value corresponding to the load current on the basis of results of the comparison in the comparator circuit.

According to this configuration, by use of the divisional voltage output circuit, the potential difference between the first voltage and the second voltage is divided into (n-1) parts (n is an integer satisfying n=$2^k$) to obtain divisional voltages. Voltages are obtained by multiplying the divisional voltage by a factor m (m is an integer of from 0 to (n-1)). Summation values obtained by adding the second voltage to the multiplied voltages respectively are successively selectively output. For example, the divisional voltage output circuit is configured to have (n-1) resistors each of which has an equal resistance value and which are series-connected between the output line of the power supply portion and the output line of the voltage generating circuit.

Further, when the switching means is turned on, the voltage on one end of the current detecting resistor is compared with each of the summation values successively selectively output. The voltage on the other end of the current detecting resistor is also compared with each of the summation values successively selectively output. A load current or a value corresponding to the load current, for example, a voltage drop over the current detecting resistor, is calculated on the basis of results of the comparison.

In this manner, each of the summation values obtained by adding the second voltage, which is lower by the predetermined voltage value than the first voltage, to a voltage obtained by multiplying the divisional voltage by a factor m is used as a reference voltage. Each of the voltage on one end of the current detecting resistor and the voltage on the other end of the current detecting resistor is compared with the reference voltage. Hence, because the second voltage serves as a virtual earth voltage, the voltages on the opposite ends of the current detecting resistor need not be converted into values with reference to the actual earth. Hence, the load current or a value corresponding to the load current can be calculated by a simple configuration.

Further, the arithmetic circuit may calculates so that, as a result of comparison by the comparator circuit, when sizes of the voltage on the one end of the current detecting resistor and each of the successively selectively outputted summation values are changed over each other, the summation value at that time is made to be the voltage value on the one end, while, when sizes of the voltage on the other end of the current detecting resistor and each of the successively selectively outputted summation values are changed over each other, the summation value at that time is made to be the voltage value on the other end, and, on the basis of a difference between the voltage values on the one and the other ends of the current detecting resistor, a voltage drop over the current detecting resistor is obtained.

According to this configuration, in the results of the comparison by the comparator circuit, when the sizes of the voltage on one end of the current detecting resistor and each of the summation values successively selectively outputted from the divisional voltage output circuit are changed over each other, the summation value is made to be the voltage value on one end of the current detecting resistor. When the sizes of the voltage on the other end of the current detecting resistor and each of the summation values successively selectively outputted from the divisional voltage output circuit are changed over each other, the summation value is made to be the voltage value on the other end of the current detecting resistor. A voltage drop over the current detecting resistor can be calculated on the basis of the potential difference between the voltage value on one end of the current detecting resistor and the voltage value on the other end of the current detecting resistor. Hence, the voltage drop can be detected with resolution of predetermined voltage/(n-1). Hence, when the numerical value n is taken large, the voltage drop can be detected accurately.

Further, the analog-digital conversion circuit may form a part of a CPU integrated on a semiconductor wafer, the CPU may have a power-supply input terminal and a ground terminal, and the first voltage may be applied to the power-supply input terminal and the second voltage may be applied to the ground terminal.

According to this configuration, the first voltage outputted from the power supply portion is applied to the power-supply input terminal of the CPU and the second voltage outputted from the voltage generating circuit is applied to the ground terminal of the CPU. Hence, the CPU operates with an operating voltage which is a predetermined voltage (for example, 5 V) to be the potential difference between the first voltage and the second voltage while the second voltage is used as a virtual earth voltage. Hence, the voltage drop over the current detecting resistor can be calculated accurately by a simple configuration.

Further, the current detecting resistor is formed from a semiconductor switching device constituting the switching means. If the predetermined resistance value is the resistance value of the ON-state resistance generated when the semiconductor switching device is turned on, the semiconductor switching device such as an FET can serve also as a current detecting resistor. Hence, the current detecting resistor need not be provided as a separate resistor, so that the circuit configuration can be simplified more greatly.

DETAILED DESCRIPTION OF THE PREFERRED EMBODIMENTS

Now, a description will be given in more detail of preferred embodiments of the invention with reference to the accompanying drawings.

Figure 1:
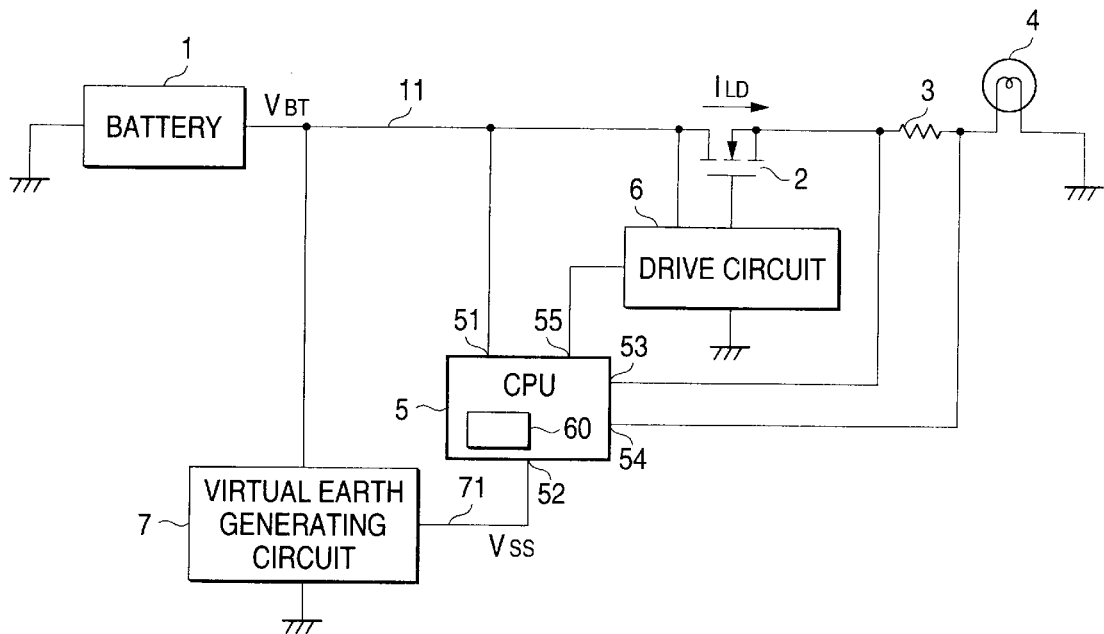
FIG. 1 is a circuit diagram showing an embodiment of a current supply circuit provided with a current detecting circuit according to the present invention.

FIG. 1 is a circuit diagram showing an embodiment of a current supply circuit provided with a current detecting circuit according to the present invention and showing an example of a current supply circuit for car.

The current supply circuit is constituted by an on-vehicle battery 1, an FET 2, a current detecting resistor 3, a load 4, a CPU 5, a drive circuit 6, and a virtual earth generating circuit 7. The FET 2, the current detecting resistor 3 and the load 4 are series-connected to each other between the on-vehicle battery 1 and the earth. When the drive circuit 6 applies a drive voltage onto a gate of the FET 2 in accordance with a control signal issued from the CPU 5, the FET 2 is turned on so that the on-vehicle battery 1 supplies a load current $I_{LD}$ to the load 4.

In FIG. 1, the on-vehicle battery 1 outputs a battery voltage $V_{BT}$ (for example, $V_{BT}$=12 V in this embodiment) to an output line 11. The virtual earth generating circuit 7 generates a low voltage $V_{SS}$ lower by a predetermined potential difference (for example, 5 V in this embodiment) than the battery voltage $V_{BT}$ and outputs the low voltage $V_{SS}$ to an output line 71. The configuration of the virtual earth generating circuit 7 will be described later.

The CPU 5 has a power supply input terminal 51, a ground terminal 52, A/D conversion input terminals 53 and 54 and an output terminal 55, as input-output terminals; and has an A/D conversion portion 60 as a functional block.

The power supply input terminal 51 is connected to the output line 11 of the on-vehicle battery 1. The ground terminal 52 is connected to the output line 71 of the virtual earth generating circuit 7. Hence, the CPU 5 operates while the low voltage $V_{SS}$ outputted to the output line 71 of the virtual earth generating circuit 7 is used as a virtual earth potential and the battery voltage $V_{BT}$ higher by a predetermined potential difference (5 V) than the low voltage $V_{SS}$ is used as a power supply.

That is, a general CPU with an operating voltage of 5 V operates between a power-supply voltage $V_{DD}$ of 5 V and an earth potential of of 0 V whereas the CPU 5 in this embodiment is provided so that the potential difference applied to the device itself is the same as that applied to the general CPU and the operating voltage of the CPU 5 is the same as that of the general CPU but the absolute value of the voltage applied to the CPU 5 is higher than that applied to the general CPU.

Further, the A/D conversion input terminals 53 and 54 of the CPU 5 are connected to the on-vehicle battery 1 side of the current detecting resistor 3 and to the load 4 side of the current detecting resistor 3 respectively. The output terminal 55 of the CPU 5 is connected to the drive circuit 6. The A/D conversion portion 60 of the CPU 5 is provided so that analog input voltage signals inputted to the A/D conversion input terminals 53 and 54 are converted into digital values respectively. The configuration of the A/D conversion portion 60 will be described later.

The CPU 5 has the following functions:
(1) a function of switching control means for turning on the FET 2 by sending a control signal to the drive circuit 6 when an operation switch (not shown) connected to an input terminal (not shown) is turned on; and
(2) a function of arithmetic means for calculating a load current $I_{LD}$ on the basis of the on-vehicle battery 1 side voltage and the load 4 side voltage of the current detecting resistor 3 which are detected by the A/D conversion portion 60 and which are inputted to the A/D conversion input terminals 53 and 54 and on the basis of the resistance value of the current detecting resistor 3.

Figure 2:
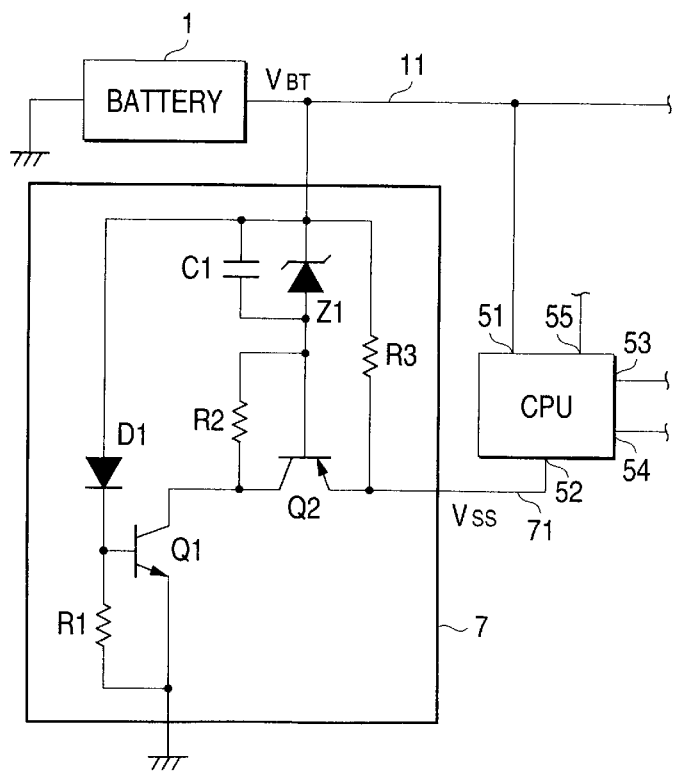
FIG. 2 is a circuit diagram showing an example of the virtual earth generating circuit.

FIG. 2 is a circuit diagram showing an example of a configuration of the virtual earth generating circuit. In FIG. 2, a diode D1 has a cathode connected to the output line 11 of the on-vehicle battery 1, and an anode connected to a base of an NPN transistor Q1 and grounded through a resistor R1. The diode D1 and the resistor R1 constitute a bias voltage generating circuit. The transistor Q1 functions as a constant-current source.

The transistor Q1 has an emitter grounded, and a collector connected to a collector of a PNP transistor Q2 and connected to a base of the transistor Q2 through a resistor R2. The transistor Q2 has the base connected to an anode of a Zener diode Z1. The Zener diode Z1 has a cathode connected to the output line 11 of the on-vehicle battery 1. A capacitor C1 is connected in parallel with the Zener diode Z1.

The transistor Q2 has an emitter connected to the output line 11 of the on-vehicle battery 1 through a resistor R3 and connected to the ground terminal 52 of the CPU 5 through the output line 71.

The a forementioned configuration satisfies the following expression:

$$V_{SS}=V_{BT}-V_{ZD}+V_{BE}(Q2)$$

in which $V_{ZD}$ is a Zener voltage of the Zener diode Z1, and $V_{BE}(Q2)$ is a base-emitter voltage of the transistor Q2.

Hence, because the base-emitter voltage $V_{BE}(Q2)$ is about 0.6 V ($V_{BE}(Q2) \approx 0.6$ V), a circuit for generating a low voltage $V_{SS}=V_{BT}-5$ V can be achieved when a Zener diode with a Zener voltage $V_{ZD}$ of about 5.6 V ($V_{ZD} \approx 5.6$ V) is used.

Figure 3:
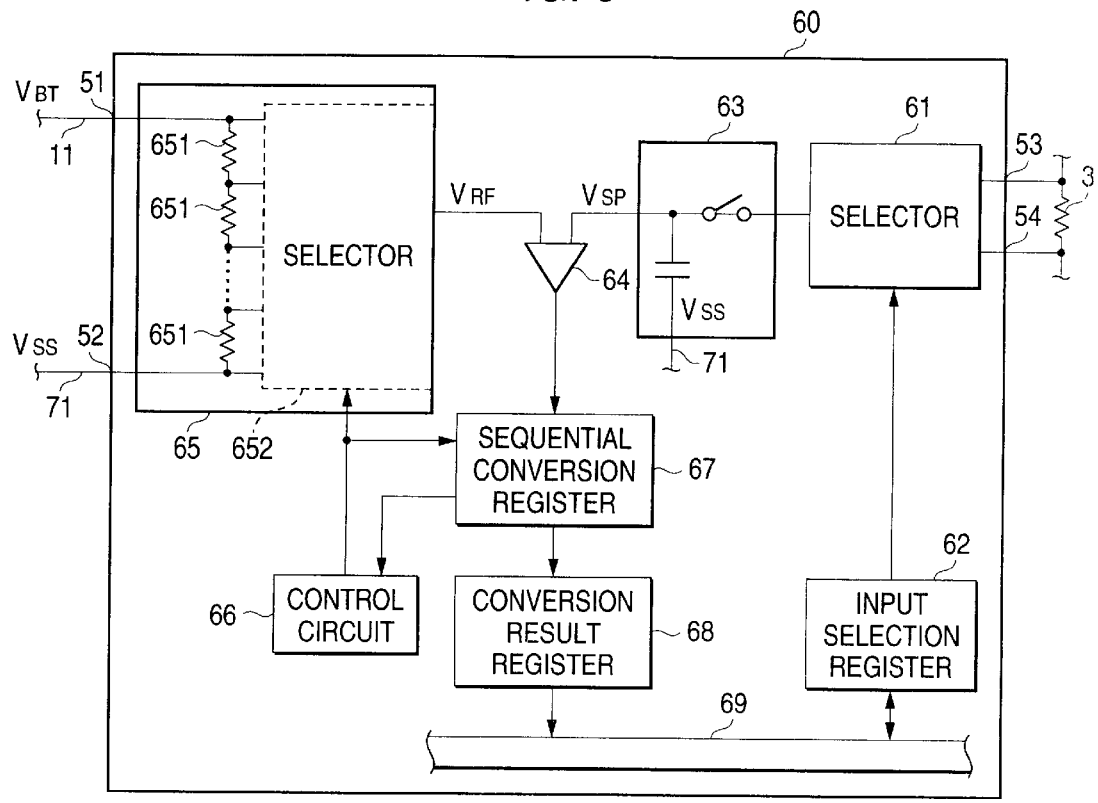
FIG. 3 is a block diagram showing the A/D conversion portion in the inside of the CPU.

FIG. 3 is a block diagram showing an example of a configuration of the A/D conversion portion 60 of the CPU 5. The A/D conversion portion 60 has a known circuit configuration for performing 8-bit A/D conversion.

In FIG. 3, a selector 61 outputs an analog input voltage signal from selected one of the A/D conversion input terminals 53 and 54 to a sample-and-hold circuit 63 in accordance with the content of an input selection register 62. The sample-and-hold circuit 63 samples the analog input voltage signal given through the selector 61 and sends the sampled analog input voltage signal to a voltage comparator 64. The sample-and-hold circuit 63 holds the sampled analog input voltage signal until the A/D conversion is completed.

A divisional voltage output circuit 65 has ($2^8$-1), that is, 255 resistors 651, 651, . . . which have the same resistance value with one another and which are series-connected between the output line 11 (power-supply voltage $V_{BT}$) and the output line 71 (low voltage $V_{SS}$). The divisional voltage output circuit 65 further has a selector 652 for successively selecting connection of the voltage comparator 64 to respective junction points (254 points in total) between the resistors 651 and the output lines 11 and 71. The selection is based on a control signal issued from a control circuit 66. By this selection, values obtained by adding the low voltage $V_{SS}$ to voltages obtained by multiplying the voltage ($V_{BT}-V_{SS}$)=5 V by each factor of 255/255 =1, 254/255, . . . , 2/255, 1/255 and 0 are successively outputted to the voltage comparator 64. When, for example, the multiplication factor is 1, the voltage $V_{BT}$ is outputted to the voltage comparator 64. When, for example, the multiplication factor is 0, the voltage $V_{SS}$ is outputted to the voltage comparator 64.

The voltage comparator 64 sequentially compares the analog input voltage signal $V_{SP}$ which is given from the sample-and-hold circuit 63, with an analog reference voltage $V_{RF}$ which is given from the divisional voltage output circuit 65, and sends a digital signal to an 8-bit sequential conversion register 67 in accordance with a result of the comparison. The sequential conversion register 67 holds the comparison result as a digital value.

The bit operation of the sequential conversion register 67 is performed by the control circuit 66 in synchronism with the selection by in the selector 652. When an operation of storing one bit into the sequential conversion register 67 is completed, the sequential conversion register 67 sends a signal to the control circuit 66 to inform the control circuit 66 of the completion of one-bit storage.

A conversion result register 68 is constituted by an 8-bit register for holding a result of A/D conversion of the analog input voltage signal $V_{SP}$. The input selection register 62 and the conversion result register 68 are connected to an ALU (arithmetic logic unit not shown) or the like through an internal bus 69.

An example of the operation of the CPU 5 will be described below. A reference voltage $V_{RF}$, which is a summation value obtained by adding the low voltage $V_{SS}$ to each voltage obtained by multiplying the voltage $(V_{BT}-V_{SS})=5$ V by a factor such as 255/255 =1, 254/255, ..., 2/255, 1/255 or 0, is successively outputted from the divisional voltage output circuit 65 to the voltage comparator 64. In the voltage comparator 64, the analog input voltage signal $V_{SP}$ is compared with the reference voltage $V_{RF}$. If $V_{SP}<V_{RF}$, a "0" signal is sent to the sequential conversion register 67. If $V_{RF}<V_{SP}$, a "1" signal is sent to the sequential conversion register 67. The sequential conversion register 67 holds a result of the comparison.

That is, as the bit contents, the sequential conversion register 67, for example, takes a value of "11111111" in the case of $V_{BT} \leq V_{SP}$, takes a value of "11101011" in the case of $(V_{BT}-V_{SS}) \cdot 235/255 + V_{SS} \leq V_{SP} < (V_{BT}-V_{SS}) \cdot 236/255 + V_{SS}$, and takes a value of "00000000" in the case of $V_{SS} \leq V_{SP} < (V_{BT}-V_{SS}) \cdot 1/255 + V_{SS}$.

In this manner, the analog input voltage signal $V_{SP}$ is compared with the reference voltage $V_{RF}$ outputted successively. Whenever the sizes of the analog input voltage signal $V_{SP}$ and the reference voltage $V_{RF}$ are changed over each other, the sequential conversion register 67 holds the reference voltage $V_{RF}$ as a voltage value at that point of time and sends the reference voltage $V_{RF}$ to the conversion result register 68. The content held in the conversion result register 68 is once stored in an RAM (not shown) contained in the CPU 5. Hence, the on-vehicle battery 1 side voltage value and the load 4 side voltage value of the current detecting resistor 3 are calculated as digital values respectively and stored in the RAM.

Then, the load 4 side voltage value of the current detecting resistor 3 is subtracted from the on-vehicle 1 side voltage value of the current detecting resistor 3. A result of the subtraction is divided by the resistance value of the current detecting resistor 3 to thereby calculate a load current $I_{LD}$.

Figure 7:
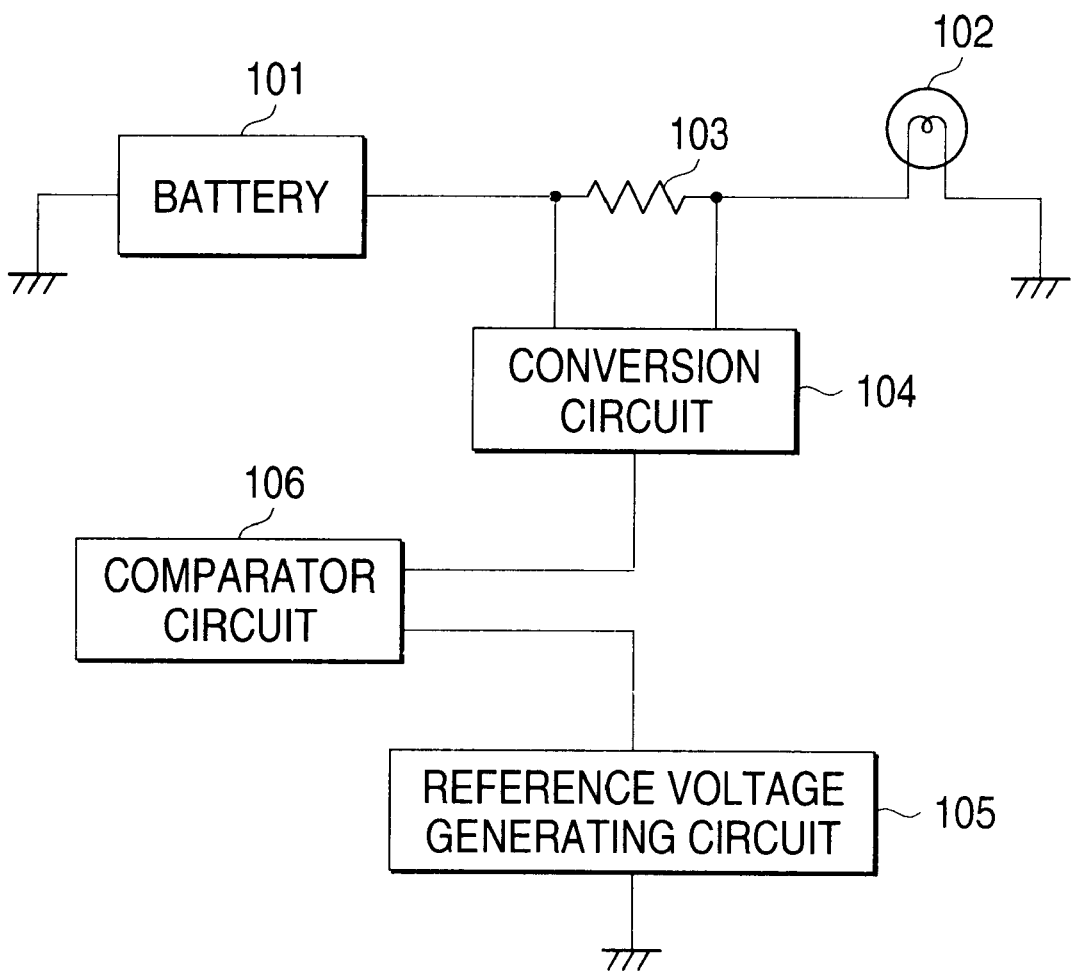
FIG. 7 is a circuit diagram showing an example of a background-art current detecting circuit.

As described above, in accordance with this embodiment, the CPU 5 with an operating voltage of 5 V is operated while the low voltage $V_{SS}=V_{BT}-5$ V is used as a virtual earth potential and the battery voltage $V_{BT}$ as a power-supply potential. Hence, because an earth potential of 0 V is not used as a reference, the background-art conversion circuit as shown in FIG. 7 need not be provided. Hence, the on-vehicle battery 1 side voltage and the load 4 side voltage of the current detecting resistor 3 can be detected by a simple circuit configuration. Hence, the load current $I_{LD}$ can be detected on the basis of the difference between the aforementioned voltages and the resistance value of the current detecting resistor 3.

Because $(V_{BT}-V_{SS})$ is kept constant (5 V) even in the case where the battery voltage $V_{BT}$ varies, the load current $I_{LD}$ can be detected accurately regardless of the variation of the battery voltage $V_{BT}$.

Further, because the on-vehicle battery 1 side voltage and the load 4 side voltage of the current detecting resistor 3 are detected by the A/D conversion portion 60 of the CPU 5, each of the above-mentioned voltages can be detected with accuracy of a high degree of about 20 mV if, for example, the A/D conversion portion 60 has 8 bits. Hence, the load current $I_{LD}$ can be detected accurately.

In this case, the resistance value of the current detecting resistor 3 may be preferably selected while the level of the load current $I_{LD}$ is taken into account, so that the load 4 side voltage of the current detecting resistor 3 takes an intermediate value between the battery voltage $V_{BT}$ and the low voltage $V_{SS}$.

The variation in characteristic of devices in an IC formed on a semiconductor wafer will be described below in order to describe the variation in resistance value of the resistors 651, ... of the divisional voltage output circuit 65 in the A/D conversion portion 60 of the CPU 5.

Each IC is produced by the steps of: forming a large number of equal circuits on a wafer cut out of an ingot of semiconductor (generally, silicon) by a known circuit-forming process; dicing the wafer into circuits (chips); and molding each circuit (chip) Hence, the variation in characteristic of devices in the IC can be classified into variation generated among chips in one wafer, variation among wafers and variation among ingots from which wafers are cut.

The variation in characteristic of devices in the IC is generated by variation in the circuit-forming process, that is, by factors such as variation in an etching step, variation in an exposure step, variation in diffusing power in an impurities diffusing step, variation in temperature in each step, and so on.

Among the aforementioned steps, the etching, exposure and impurities diffusing steps which are factors of the variation are carried out wafer by wafer. On one and the same wafer, temperature can be kept the same in the respective steps. Hence, variation in characteristic hardly occurs among chips in one wafer. Particularly variation among devices formed near to one another in one chip can be almost neglected.

Hence, relative variation in resistance value of the resistors 651, ... can be made on a very low level. Hence, the A/D conversion of the analog input voltage signal $V_{SP}$ can be made accurately by the A/D conversion portion 60 of the CPU 5. Accordingly, the load current $I_{LD}$ can be detected accurately.

Incidentally, the present invention is not limited to the aforementioned embodiment and the following modifications may be made.

(1) Although the aforementioned embodiment has shown the case where the current detecting resistor 3 is series-connected between the on-vehicle battery 1 and the load 4, the present invention is not limited thereto.

Figure 4:
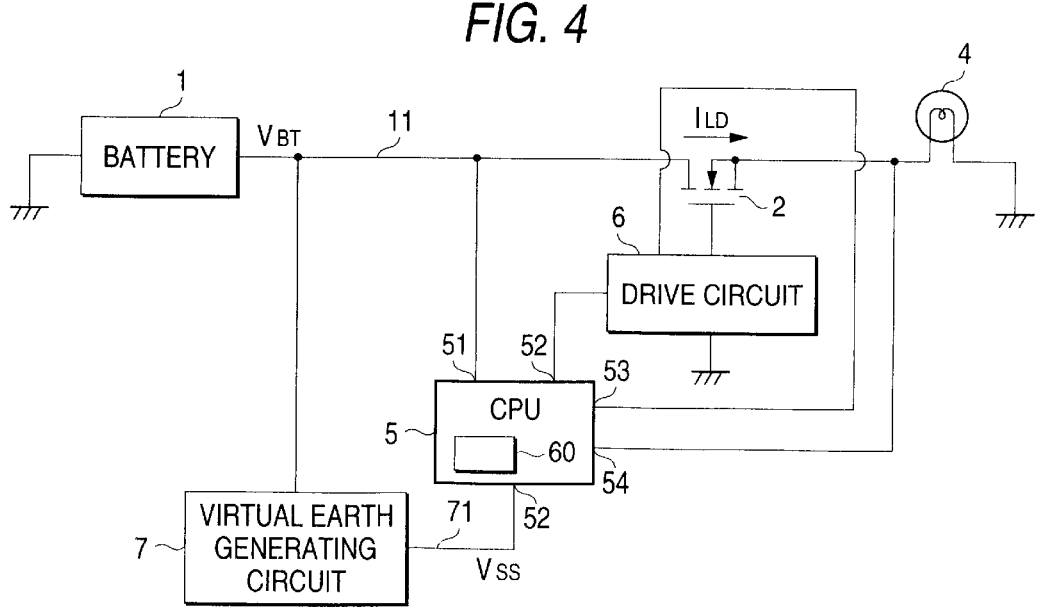
FIG. 4 is a circuit diagram showing a modified embodiment of the current supply circuit.

In FIG. 4, the A/D conversion input terminals 53 and 54 of the CPU 5 are connected to a drain of an FET 2 and a source of the FET 2 respectively. The FET 2 serves also as a current detecting resistor. In this case, the load current $I_{LD}$ can be detected in the same manner as that in the aforementioned embodiment if the ON-state resistance of the FET 2 is measured in advance.

According to the embodiment shown in FIG. 4, the circuit configuration can be simplified more greatly because the current detecting resistor 3 is dispensed with.

(2) The circuit configuration of the virtual earth generating circuit 7 and the circuit configuration of the A/D conversion portion 60 are not limited to the examples shown FIGS. 2 and 3 respectively and other circuit configurations may be used.

(3) Although the aforementioned embodiment has shown the case where the A/D conversion portion 60 performs 8-bit A/D conversion, the present invention is not limited thereto. For example, in the case of 10-bit A/D conversion, the load current can be detected more accurately.

Incidentally, in the case of k-bit A/D conversion, the divisional voltage output circuit 65 shown in FIG. 3 may preferably have n resistors 651 in which n is equal to $(2^k-1)$ (4) Although the aforementioned embodiment has shown the case where values obtained by adding the low voltage $V_{SS}$ to voltages obtained by multiplying the voltage $(V_{BT}-V_{SS})=5$ V by each factor of 255/255 =1, 254/255, ..., 2/255, 1/255 and 0 are successively outputted from the selector 652 of the divisional voltage output circuit 65 to the voltage comparator 64, the output order is not limited thereto. In reverse order, values obtained by adding the low voltage $V_{SS}$ to voltages obtained by multiplying the voltage $(V_{BT}-V_{SS})=5$ V by each factor of 0, 1/255, 2/255, ..., 254/255 and 255/255 may be successively outputted to the voltage comparator 64.

(5) Although FIGS. 1 and 4 show the case where the load 4 is constituted by a lamp, the present invention is not limited thereto. For example, the load 4 may be constituted by a secondary battery. In this case, the charging current as a load current supplied from the on-vehicle battery 1 to the secondary battery can be detected accurately.

(6) Although the aforementioned embodiment has shown the case where the A/D conversion portion 60 is contained in the CPU 5, the present invention is not limited thereto and the A/D conversion portion 60 may be provided as a separate circuit to be externally attached to the CPU 5. Further, the circuit configuration of the A/D conversion portion 60 is not limited to the example shown in FIG. 3.

Figure 5:
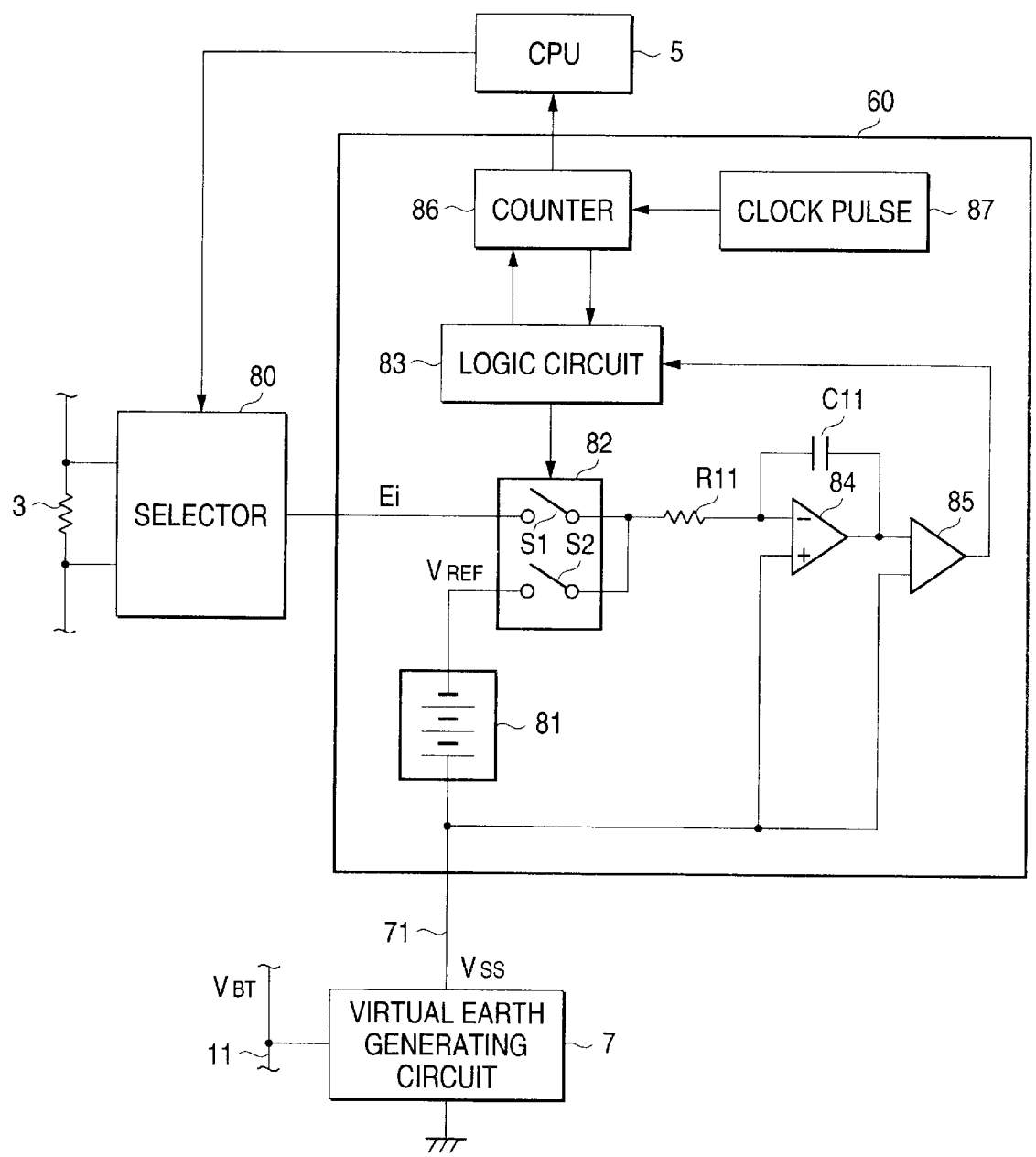
FIG. 5 is a block diagram showing another example of the configuration of the A/D conversion portion.
Figure 6:
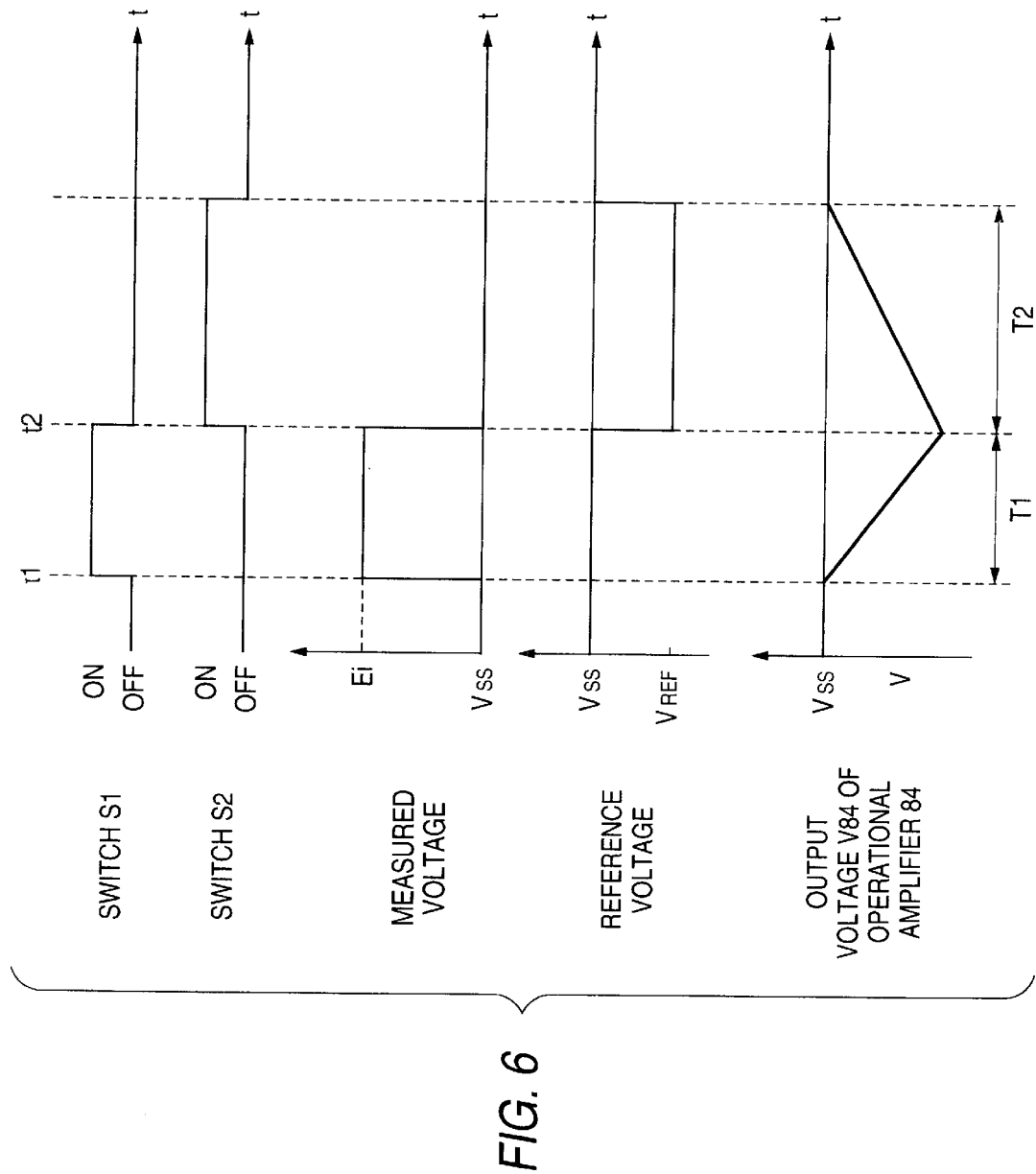
FIG. 6 is a timing chart for explaining the operation of the A/D conversion portion depicted in FIG. 5.

FIG. 5 is a block diagram showing another example of the configuration of the A/D conversion portion. FIG. 6 is a timing chart for explaining the operation of the A/D conversion portion depicted in FIG. 5.

The A/D conversion portion 60 depicted in FIG. 5 is constituted by a known double-integral type A/D conversion circuit, which is externally attached to the CPU 5.

In FIG. 5, a selector 80 selectively connects one end (for example, battery side) and the other end (for example, load side) of the current detecting resistor 3 to the A/D conversion portion 60. The selection of connection is controlled by the CPU 5.

A negative voltage generating circuit 81 in the A/D conversion portion 60 generates a reference voltage $V_{REF}$ lower by a predetermined voltage value than the low voltage $V_{SS}$. A selector 82 has a switch S1 connected to the selector 80, and a switch S2 connected to the negative voltage generating circuit 81. The ON/OFF of the switches S1 and S2 is controlled by a logic circuit 83.

A resistor R11, a capacitor C11 and an operational amplifier 84 constitute an integrating circuit (the operation of which will be described later). A comparator 85 compares the low voltage $V_{SS}$ with a voltage $V_{84}$ outputted from the operational amplifier 84. When $V_{84}=V_{SS}$, the comparator 85 outputs a predetermined detection signal. The logic circuit 83 has a function of controlling the switching-over of the selector 82 on the basis of a count value of a counter 86, a function of resetting the count value of the counter 86, and so on.

The counter 86 counts the number of pulses generated by a clock pulse signal generating circuit 87. When, for example, the counter 86 counts 1000 pulses in the case where a pulse signal with 10 kHz is generated by the clock pulse signal generating circuit 87, the elapsed time is 0.1 sec.

The operation of the A/D conversion portion in FIG. 5 will be described below with reference to FIG. 6 which is a timing chart. Incidentally, also in the circuit shown in FIG. 5, the low voltage $V_{SS}$ serves as a virtual earth in the same manner as that in the aforementioned embodiment.

In FIG. 6, in the case of $V_{84}=V_{SS}$ (at the point of time t1), a detection signal is outputted from the comparator 85. The logic circuit 83 turns on the switch S1 on the basis of the detection signal, so that the voltage Ei measured at one end of the current detecting resistor 3 is inputted to the integrating circuit through the selector 80.

The voltage $V_{84}$ outputted from the operational amplifier 84 rises linearly in a negative direction because the measured voltage Ei is a positive voltage relative to the low voltage $V_{SS}$. On this occasion, the inclination of the line is proportional to the size of the measured voltage Ei.

The ON-state time T1 of the switch S1 is determined to be a predetermined value (for example, 0.1 sec) in advance. When the count value of the counter 86 reaches the predetermined value, the switch S1 is turned off by the logic circuit 83 (at the point of time t2). Hence, when the switch S1 is turned off, the output voltage $V_{84}$ is proportional to the size of the measured voltage Ei.

At the same time that the switch S1 is turned off, the switch S2 is turned on by the logic circuit 83 and the count value of the counter 86 is reset. When the switch S2 is turned on, the reference voltage $V_{REF}$ is inputted from the negative voltage generating circuit 81 to the integrating circuit. The voltage $V_{84}$ outputted from the operational amplifier 84 rises linearly in a positive direction because the reference voltage $V_{REF}$ is a negative voltage relative to the low voltage $V_{SS}$.

When the output voltage $V_{84}$ further rises and reaches $V_{SS}$ ($V_{84}=V_{SS}$) after time T2, the comparator 85 outputs a detection signal. The logic circuit 83 turns off the switch S2 on the basis of the detection signal and the counting operation of the counter 86 is stopped.

When the output voltage $V_{84}$ rises linearly in a positive direction, the inclination of the line is proportional to the size of the reference voltage $V_{REF}$. That is, the inclination is always constant because the reference voltage $V_{REF}$ is constant. Because the time T1 and the reference voltage $V_{REF}$ are given and the time T2 is proportional to the measured voltage Ei, the count value of the counter 86 at the point of time after the time T2 passed is obtained as a digital value of the measured voltage Ei. The digital value of the measured voltage Ei is stored in the RAM of the CPU 5.

Hence, when the selector 80 is switched over by the CPU 5, voltages at one end and the other end of the current detecting resistor 3 can be obtained as digital values.

Hence, a voltage drop over the current detecting resistor 3 can be calculated by the CPU 5 in the same manner as that in the aforementioned embodiment. Thus, the same effects as in the aforementioned embodiment can be obtained.

As described above, in accordance with the present invention, a second voltage lower by a predetermined voltage value than a first voltage outputted from a power supply portion is generated and outputted to there by operate an analog-digital conversion circuit on the basis of the potential difference between the first voltage and the second voltage. When switching means is turned on, a voltage at one end of a current detecting resistor and a voltage at the other end of the current detecting resistor are converted into k-bit digital values respectively by the analog-digital conversion circuit. A load current or a value corresponding to the load current is calculated on the basis of the results of the conversion. Hence, the voltages on both the ends of the current detecting resistor need not be converted into values with reference to the earth, so that the load current or a value corresponding to the load current can be calculated by a simple configuration. Moreover, when the numerical value k is changed, detection of the load current can be made with accuracy of a desired degree.

Further, the potential difference between the first voltage and the second voltage is divided into (n-1) parts to obtain divisional voltages. Voltages are obtained by multiplying the divided voltage by a factor m. Summation values obtained by adding the second voltage to the multiplied voltages respectively are successively and selectively output. The voltage on one end of the current detecting resistor is compared with each of the summation values successively selectively output. The voltage on the other end of the current detecting resistor is compared with each of the summation values. A load current or a value corresponding to the load current is obtained on the basis of results of the comparison. Hence, the voltages on both the ends of the current detecting resistor need not be converted into values with reference to the earth. Hence, the load current or a value corresponding to the load current can be calculated by a simple configuration.

Further, in the results of the comparison by the comparator circuit, when the sizes of the voltage on one end of the current detecting resistor and one of the summation values successively selectively outputted are changed over each other, the summation value is made to be the voltage value on one end of the current detecting resistor. When the sizes of the voltage on the other end of the current detecting resistor and one of the summation values successively selectively outputted are changed over each other, the summation value is made to be the voltage value on the other end of the current detecting resistor. By calculating a voltage drop over the current detecting resistor on the basis of the difference between the voltage value on one end of the current detecting resistor and the voltage value on the other end of the current detecting resistor, the voltage drop is detected with resolution of predetermined voltage/(n-1). Hence, when the numerical value n is taken large, the voltage drop can be detected accurately.

Further, the analog-digital conversion circuit forms a part of the CPU integrated on a semiconductor wafer. When the first voltage is applied to the power-supply input terminal of the CPU and the second voltage is applied to the ground terminal of the CPU, the CPU operates with an operating voltage which is a predetermined voltage to be the potential difference between the first voltage and the second voltage while the second voltage is used as a reference virtual earth. Hence, the voltage drop over the current detecting resistor can be calculated accurately by a simple configuration.

Further, when the current detecting resistor is constituted by a semiconductor switching device constituting switching means so that the predetermined resistance value is the resistance value of the ON-state resistance generated when the semiconductor switching device is turned on, the semiconductor switching device can serve also as a current detecting resistor. Hence, the current detecting resistor need not be provided as a separate resistor, so that the circuit configuration can be simplified more greatly.

What is claimed is:

1. A current detecting circuit for use in a current supply circuit for supplying a load current from a power supply portion to a load when a switching unit interposed between said power supply portion and said load is turned on, said current detecting circuit comprising:

a voltage generating circuit for generating and outputting a second voltage which is lower by a predetermined voltage value than a first voltage outputted from said power supply portion;

a current detecting resistor interposed between said power supply portion and said load and having a predetermined resistance value;

an analog-digital conversion circuit which operates on the basis of a potential difference between said first voltage and said second voltage to thereby convert analog values into k-bit digital values, where k is an integer not smaller than 2; and an arithmetic circuit for calculating at least one of said load current and a value corresponding to said load current on the basis of the digital values which are obtained by the analog-digital conversion of voltages respectively on one and the other ends of said current detecting resistor by said analog-digital conversion circuit when said switching unit is turned on.

2. A current detecting circuit according to claim 1, wherein:

said analog-digital conversion circuit comprises:

a divisional voltage output circuit for successively selectively outputting summation values which are obtained by adding said second voltage to various voltage values which are obtained by multiplying a divisional voltage by m, m is an integer from 0 to n-1, said divisional voltage being obtained by dividing a potential difference between said first voltage and said second voltage into n-1 parts, where n is an integer satisfying n-$2^k$;

a comparator circuit for comparing said voltage on said one end of said current detecting resistor with each of said summation values which are successively selectively outputted from said divisional voltage output circuit and for comparing said voltage on the other end of said current detecting resistor with each of said summation values which are successively selectively outputted from said divisional voltage output circuit; and said arithmetic circuit calculating the at least one of said load current and the value corresponding to said load current on the basis of results of said comparison in said comparator circuit.

3. A current detecting circuit according to claim 2, wherein:

said arithmetic circuit uses in the calculation the summation value at which an inequality relation between the analog value of the voltage on the one end of the current detecting resistor and the summation values successively selectively outputted is changed over in the comparison result by the comparator circuit, as the digital value of the voltage on the one end of the current detecting resistor, said arithmetic circuit uses in the calculation the summation value at which an inequality relation between the analog value of the voltage on the other end of the current detecting resistor and the summation values successively selectively outputted is changed over in the comparison result by the comparator circuit, as the digital value of the voltage on the other end of the current detecting resistor; and the arithmetic circuit calculates voltage drop over the current detecting resistor on the basis of a difference between the digital value of the voltage on the one end of the current detecting resistor and the digital value of the voltage on the other end of the current detecting resistor.

4. A current detecting circuit according to claim 1, wherein said analog-digital conversion circuit forms a part of a CPU integrated on a semiconductor wafer; said CPU has a power-supply input terminal and a ground terminal; and said first voltage is applied to said power-supply input terminal and said second voltage is applied to said ground terminal.

5. A current detecting circuit according to claim 1, wherein said current detecting resistor is formed from a semiconductor switching device constituting said switching means; and said predetermined resistance value is a resistance value of ON-state resistance generated when said semiconductor switching device is turned on.

* * * * *